United States Patent [19]
Wallace

[11] Patent Number: 5,692,424
[45] Date of Patent: Dec. 2, 1997

[54] FOOD SLICER

[76] Inventor: Stephen C. Wallace, 1174 Hilltop Rd., Erie, Pa. 16509

[21] Appl. No.: 580,989

[22] Filed: Jan. 3, 1996

[51] Int. Cl.$^6$ .................................................. B26D 1/03
[52] U.S. Cl. ............................. 83/167; 83/651; 83/857; 83/932
[58] Field of Search .................. 83/932, 651.1, 83/857, 858, 167, 436.2, 425.3

[56] References Cited

U.S. PATENT DOCUMENTS

| | | | |
|---|---|---|---|
| 590,129 | 9/1897 | Bulette | 83/857 |
| 2,245,978 | 6/1941 | Hyland | 83/858 |
| 2,558,567 | 6/1951 | Kaeser | 83/167 |
| 3,216,474 | 11/1965 | Popeil | 83/651.1 |
| 4,297,932 | 11/1981 | Wells, Jr. et al. | 83/651.1 |

Primary Examiner—Kenneth E. Peterson
Attorney, Agent, or Firm—Chase & Yakimo

[57] ABSTRACT

A food slicer comprises a storage reservoir, a cutting blade housing with cutting blade therein and a top lid. The reservoir, housing and top lid are releasably connected to each other by complementary hinges. A cutting blade comprises a frame having a plurality of cutting wires spanning the frame is releasably engageable within the cutting blade housing. Upon placement of a food product on the cutting blade, downward pressure of the open lid urges the food product passed the cutting blade wires, the resulting food product slices falling in the storage reservoir therebelow. The storage reservoir is releasably engageable from the cutting blade housing to enable the reservoir to be used as a separate serving and/or baking dish. A releasable engagement of the cutting blade with the cutting blade housing allows for a plurality of variously configured cutting blades to be utilized.

8 Claims, 8 Drawing Sheets

FOOD SLICER

BACKGROUND OF THE INVENTION

This invention relates to a food slicer and, more particularly, to a slicing device particularly designed to store, cut and serve food slices of various configurations.

The use of wire-type food slicers to cut food products, such as cheese, eggs, etc., is known. However, such devices have inherent limitations as their structure are not designed to store and/or serve the resulting sliced pieces. Moreover, it is also desirable to slice the food products into various configurations by changing the configuration of the cutting blade.

In response thereto I have invented a food slicer which generally comprises a food reservoir/serving container with a cutting blade housing releasably attached thereto. The housing releasably receives wire cutting blades of various designs. A top lid is swingably connected thereto and includes a depending planar surface. Upon placement of the food product atop the cutting blade, swingable movement of the top lid to a closed position urges the food product through the cutting blade proper. The resulting sliced pieces are then deposited into the lower reservoir. The above elements are releasably detached from the lower reservoir enabling the reservoir to be used as a serving or baking dish.

It is therefore a general object of this invention to provide a food slicer for cutting food products into variously configured slices by variously configured cutting blades.

Another object of this invention is to provide a food slicer, as aforesaid, the cutting blades being releasably engageable with a cutting blade housing.

A still further object of this invention is to provide a food slicer, as aforesaid, having a top lid swingably connected to the cutting blade housing, the top lid presenting a depending surface for urging the food product through the cutting blade.

A further object of this invention is to provide a food slicer, as aforesaid, having a storage reservoir releasably connected to the cutting blade housing, the storage reservoir functioning as a serving/baking dish.

Another further object of this invention is to provide a food slicer, as aforesaid, the top lid, cutting blade housing and storage reservoir releasably connected among each other.

Still another object of this invention is to provide a food slicer, as aforesaid, which is easily maintained and is adaptable for use with food products of various configurations.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
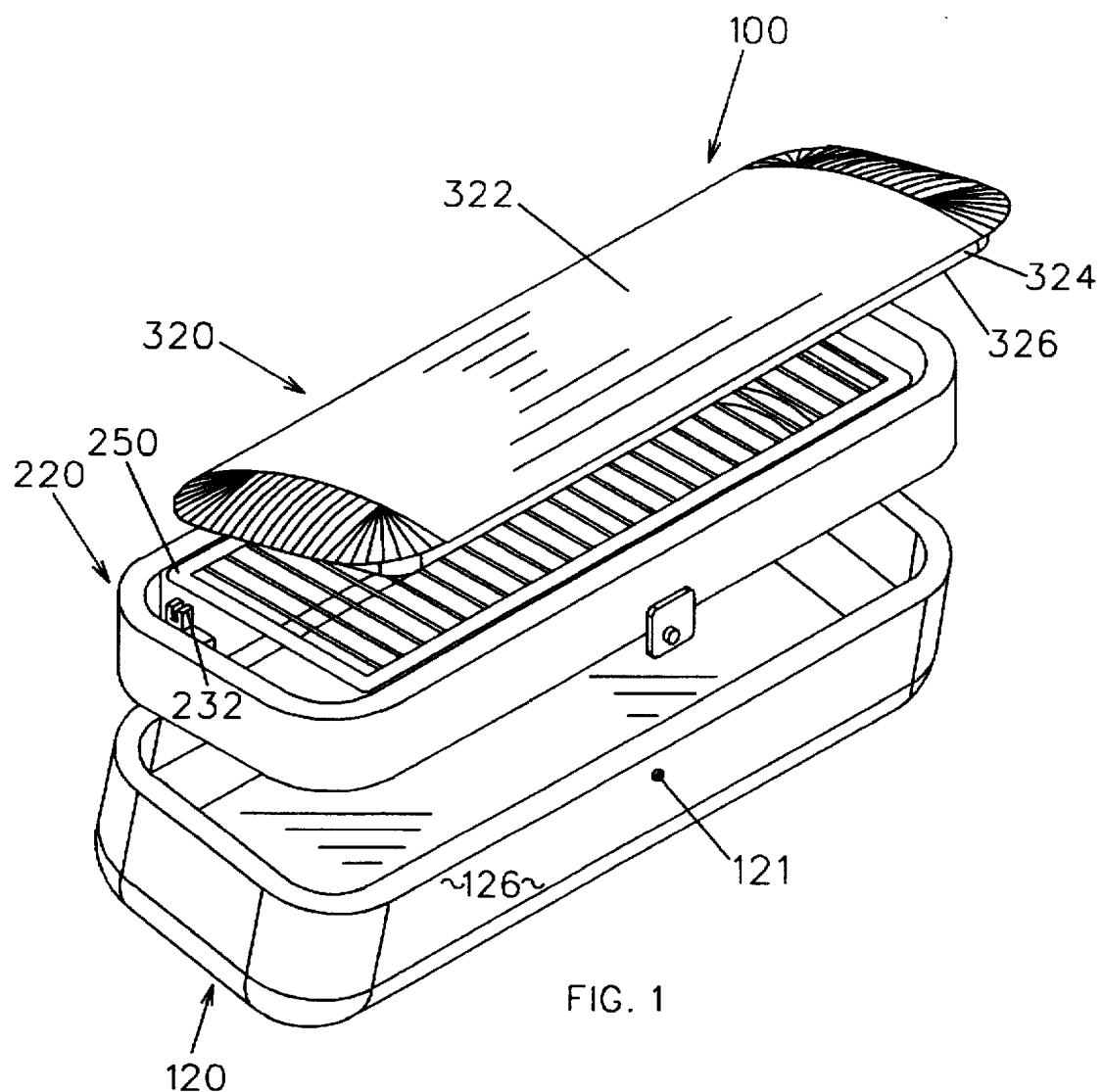
FIG. 1 illustrates an exploded perspective view of the food slicer.
Figure 2:
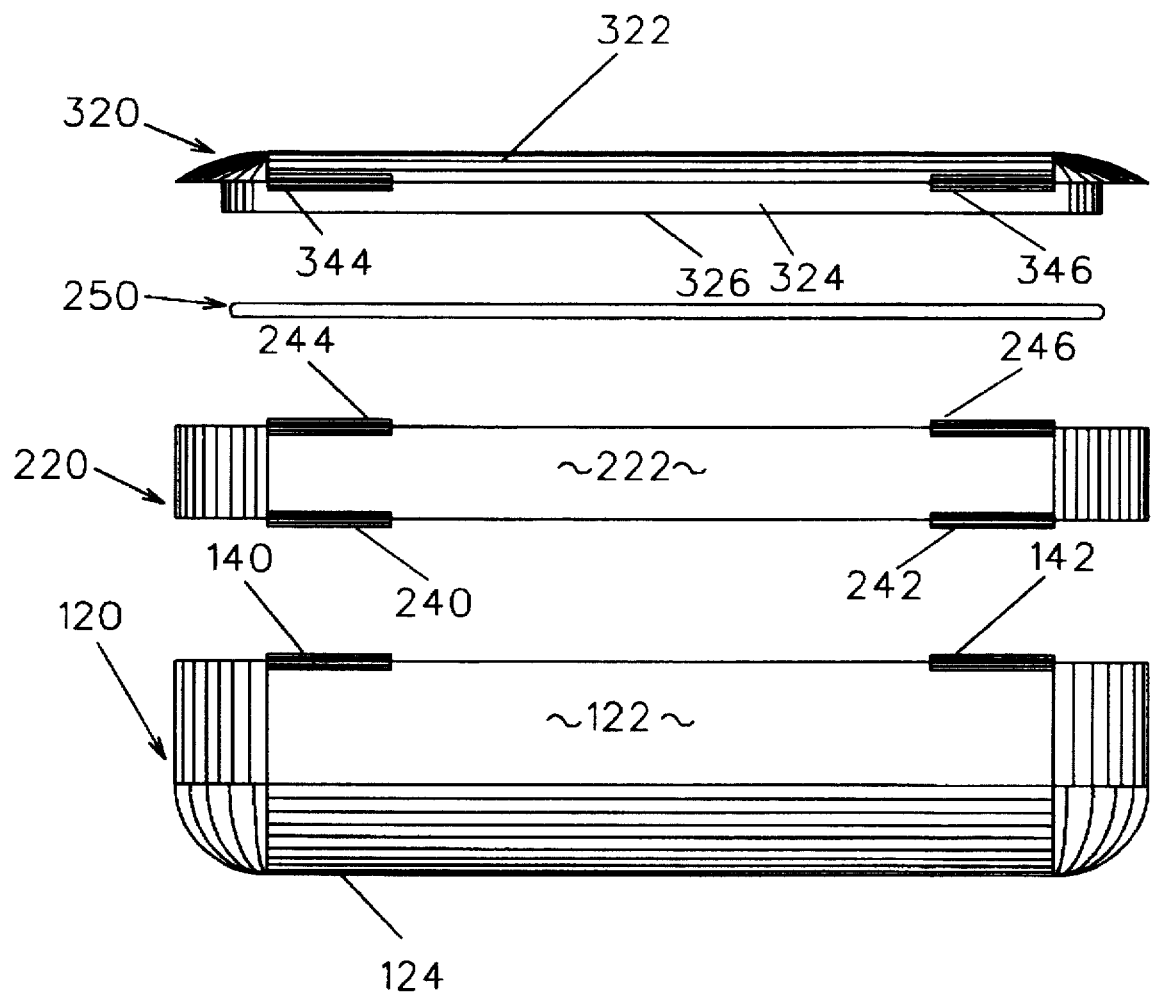
FIG. 2 is an exploded, rear elevation view, on an enlarged scale, of the food slicer of FIG. 1.

Turning more particularly to the drawings, FIG. 1 shows the food slicer 100 as generally comprising a lower storage reservoir 120, an intermediate cutting blade housing 220, cutting blade 250 and a top lid 320. The cutting blade housing 220 is pivotally connected and latched to the storage reservoir 120 with the top lid 320 being pivotally connected to the cutting blade housing 220.

Figure 3:
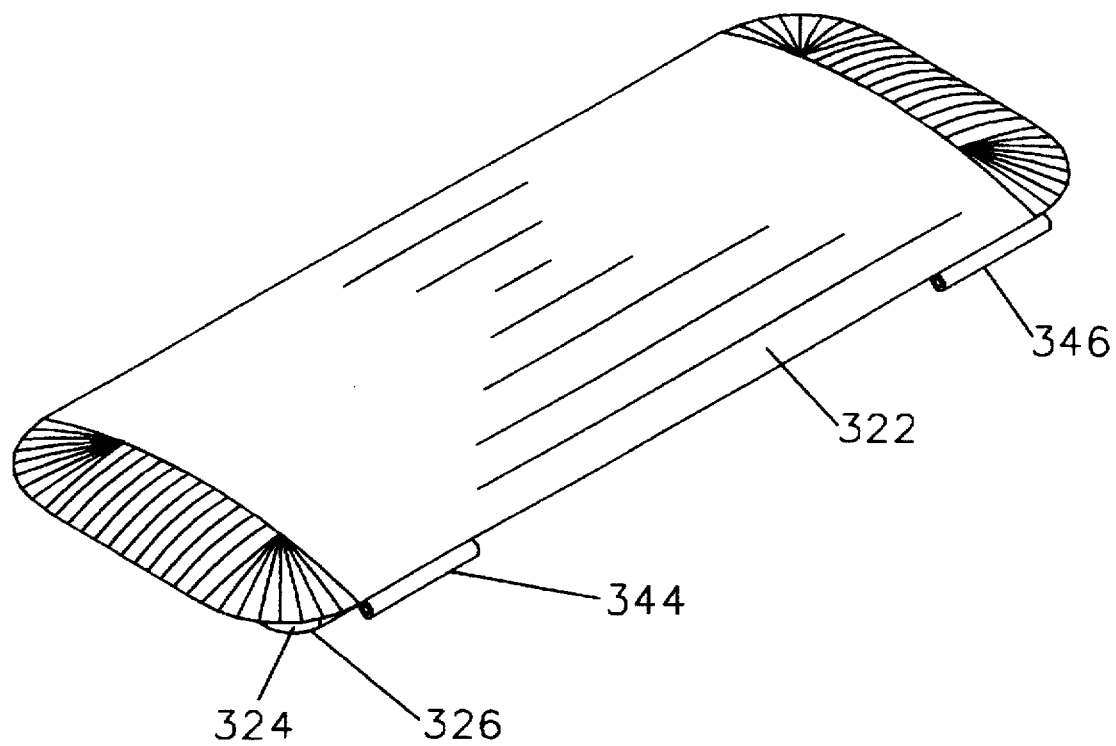
FIG. 3 is a rear perspective view of the top lid of the food slicer of FIG. 1.
Figure 4:
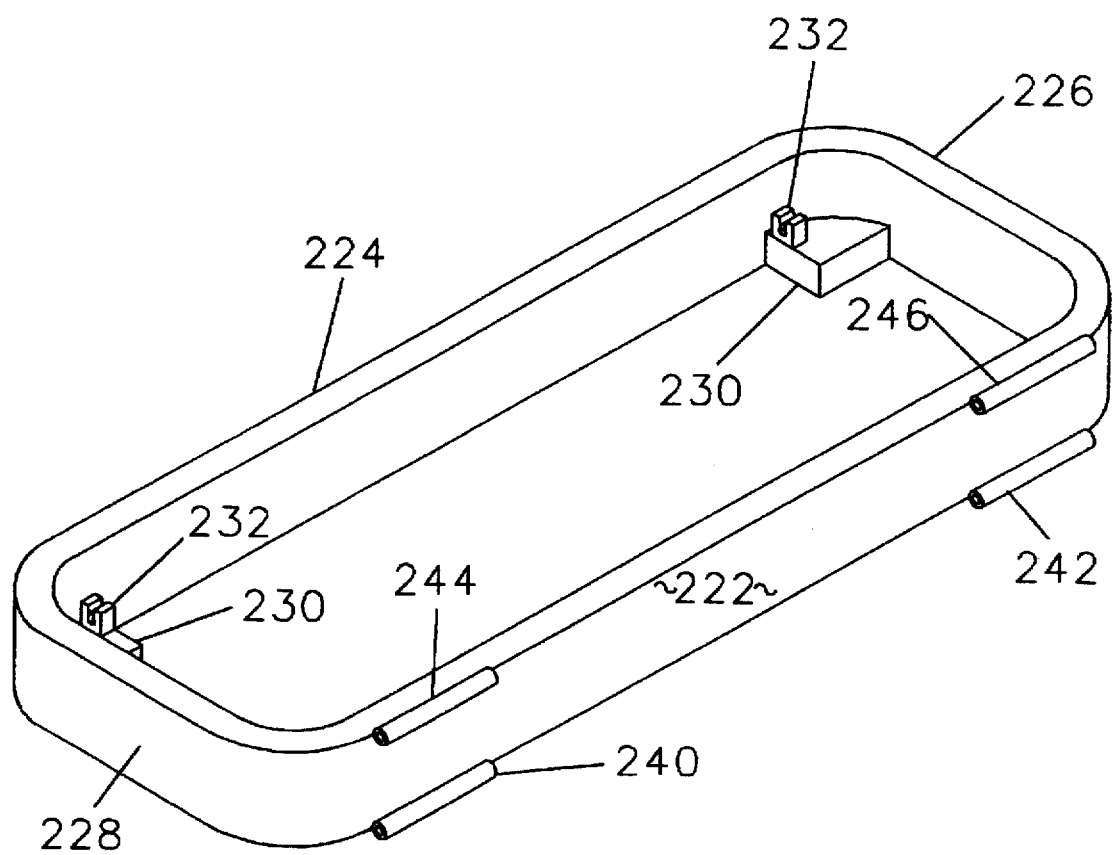
FIG. 4 is a rear perspective view of the cutting blade housing of the food slicer of FIG. 1.
Figure 5:
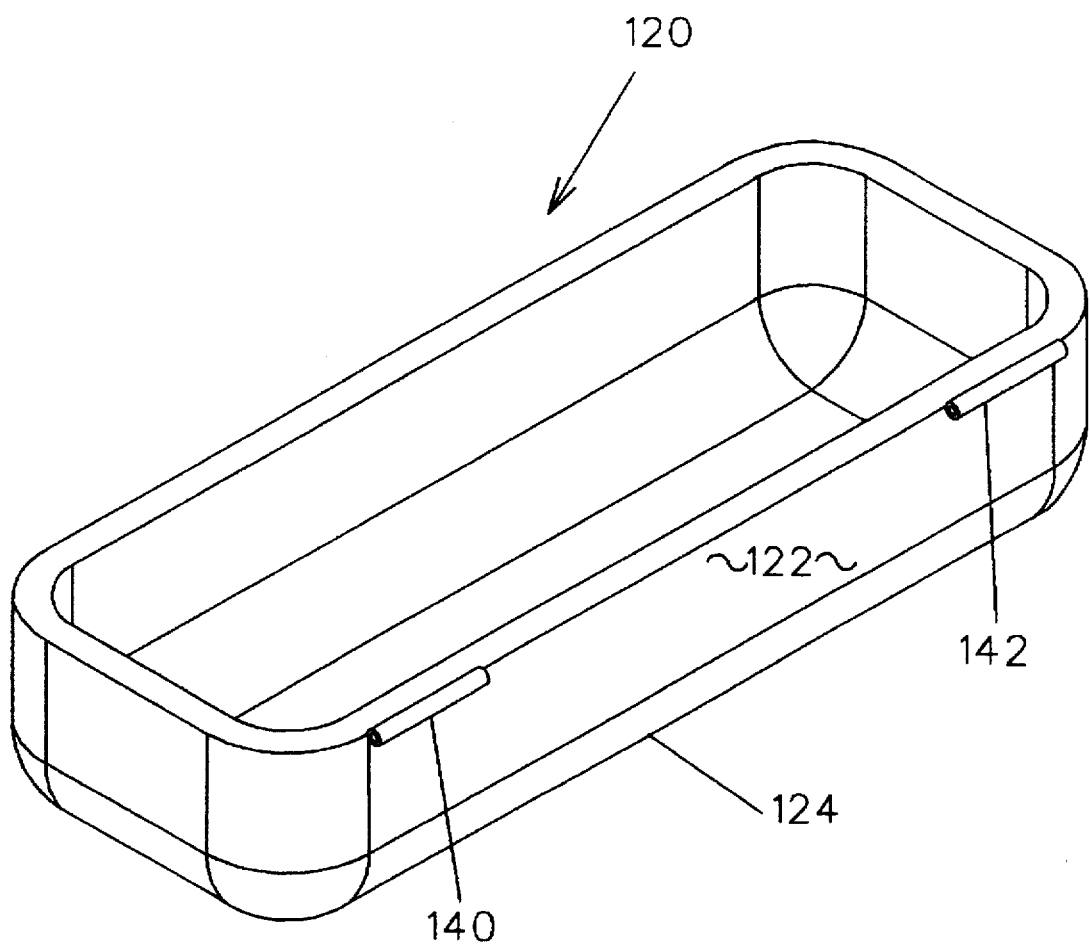
FIG. 5 is a rear perspective view of the storage reservoir/serving dish of the food slicer of FIG. 1.

The top lid 320 (FIG. 3) is generally rectangular in configuration and presents rounded corners. The top lid 320 comprises an exterior cover 322 with wall 324 depending therefrom, the wall 324 being of a reduced perimetrical configuration relative to the perimeter of the cover 322. The depending wall 324 presents a free planar surface 326 which is generally parallel to the cutting blade 250 upon closure of lid 320. The relatively reduced configuration of the depending wall 324 enables the wall 324 to fit within the confines of the underlying cutting blade housing 220.

The cutting blade housing 220 presents a generally rectangular configuration including a rear wall 222, front wall 224 and longitudinally opposed side walls 226, 228. The configuration of the cutting blade housing 220 enables the depending wall 324 to be received therein. Positioned at each corner of the cutting blade housing 220 is a horizontally extending flange 230 having a clamp 232 upwardly extending therefrom. Extending from the rear wall 222 of the cutting blade housing 220 are first and second lower hinges 240, 242 designed to engage complementary hinges 140, 142 found on the rear wall 22 of lower storage reservoir 120. Upper hinges 244, 246 on rear wall 222 are designed to engage complementary hinges 344, 46 found at the rear of the cover 322 of top lid 320. These hinge combinations enable the cutting blade housing 220 to be releasably engaged with the lower storage reservoir 120 with the top lid 320 being further swingably engaged to the cutting blade housing 220. Along the front wall of the cutting blade housing 220 is latch 221 designed to snap into aperture 121 found in the lower storage reservoir 120.

The storage reservoir 120 presents a housing with open top, the housing 120 having the perimetrical configuration of the cutting blade housing 220. As stated, hinges 140, 142 on the rear wall 122 of the housing 120 releasably engage the lower hinges 240, 242 found on the cutting blade housing. The lower surface 124 of the storage reservoir 120 is designed to rest on an underlying support surface, such as a table or the like, without wobbling, tipping, etc. The depth of the storage reservoir housing 120, as formed by the height of the housing 120 walls, is preferably greater than that of the cutting blade housing 220. Further located on the front wall 126 of the lower storage reservoir 120 is aperture 121 which engages a complementary clasp or latch member 221 found on the front wall of the cutting blade housing 220 in a locking relationship therebetween.

Figure 6:
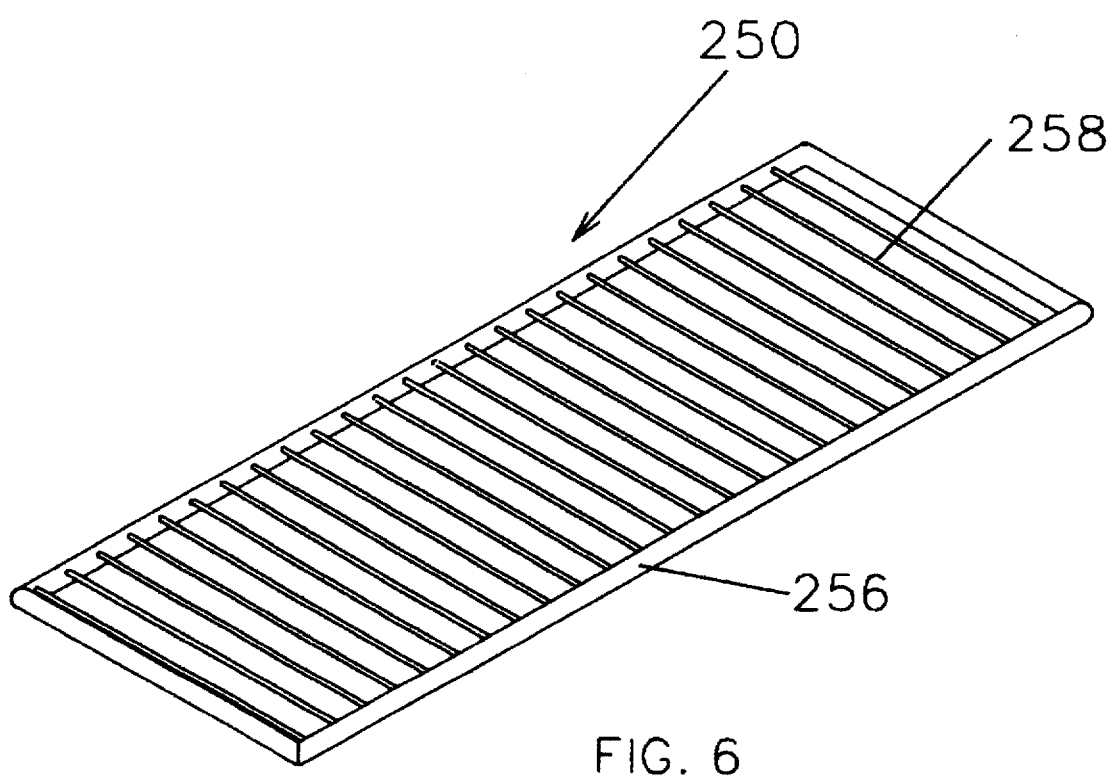
FIG. 6 is a view of one cutting blade utilized with the food slicer of FIG. 1.
Figure 7:
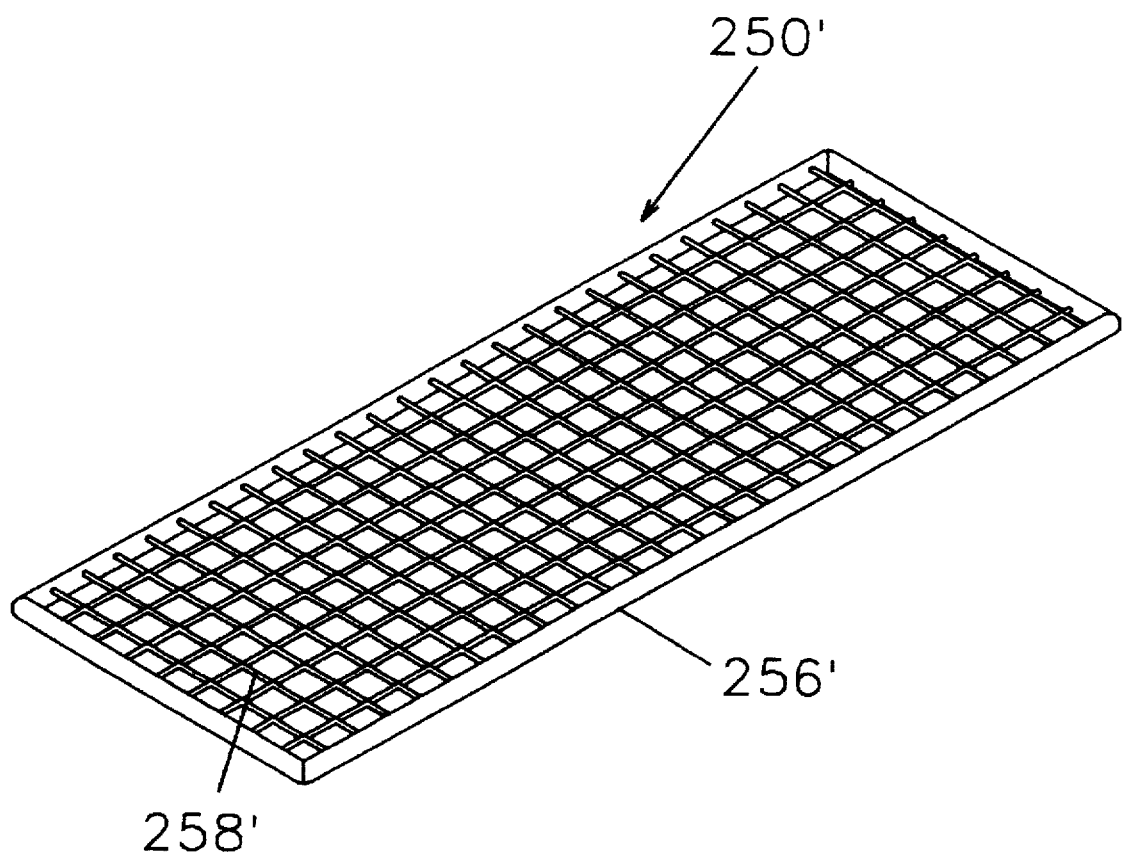
FIG. 7 is an alternate cutting blade utilized with the food slicer of FIG. 1.
Figure 8:
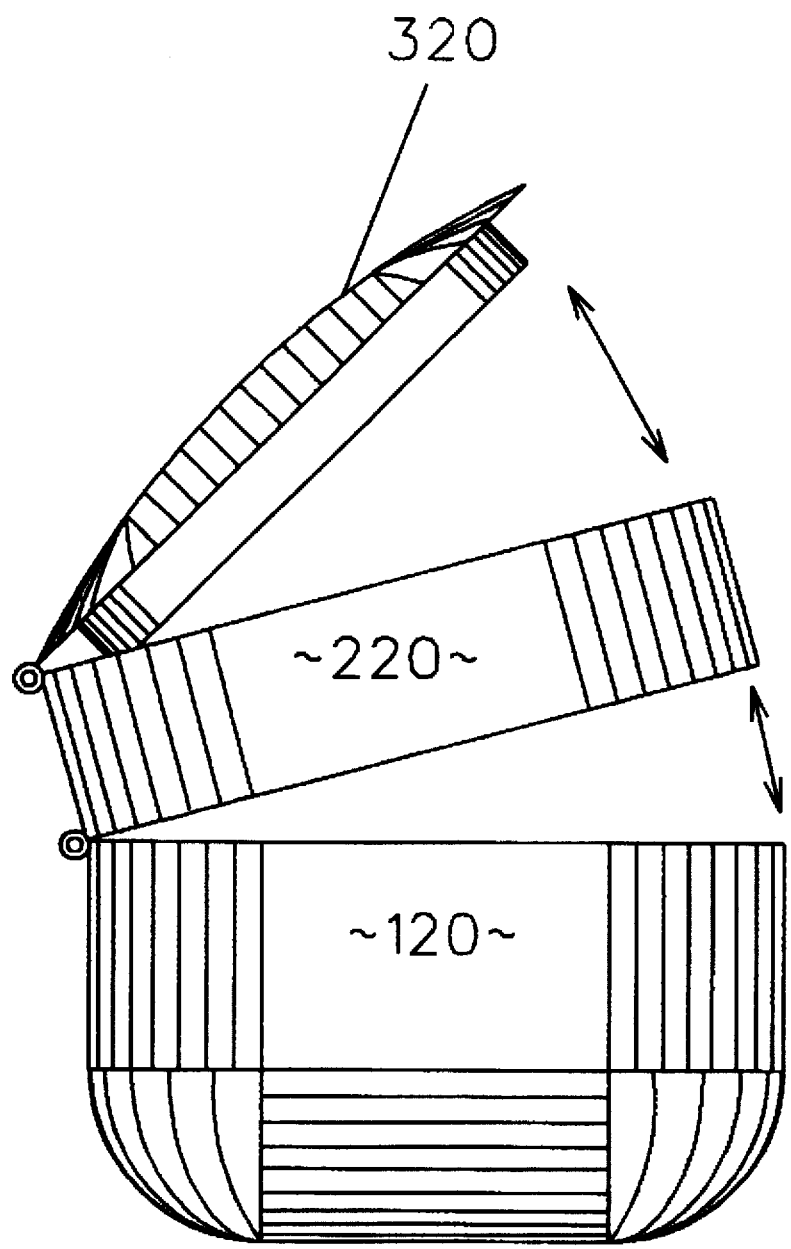
FIG. 8 shows the pivotability of the parts relative to one another.

As shown in FIGS. 6 and 7, the cutting blades 250, 250' present a frame 256, 256' with a plurality of thin cutting wires 258, 258' spanning the frame 256, 256' in a desired configuration. The frame 256 or 256' releasably engages the clamps 232 upwardly extending from each horizontal corner flange 230 found in the cutting blade housing 220.

The overall configuration of the food slicer 100 is chosen so as to accommodate the food product to be sliced therein. For example, the housing 100 as shown may be used to slice bananas, hot dogs and similarly configured food products. In use a hot dog is placed on the cutting blade 250 within housing 220. Upon the lid 320 being swung from an open position to a closed position downward pressure is exerted by the free planar surface 326 of the top lid 320 on the hot dog. The hot dog is thus forced through the open cutting blade 250 and sliced by the interior wires 258 thereof. The resulting slices are deposited into the lower storage reservoir 120. Subsequently, the cutting blade housing 220 with top lid 320 thereon may be removed from this lower storage reservoir 120 by disengaging the hinges 240, 242 from hinges 140, 142 and unlocking latch 221. This lower storage reservoir 120 can then be used for baking or serving the sliced hot dog pieces therein. The resulting configuration of the food product slices may be changed by releasing blade 250 from clamps 232 and substituting blade 250' therefor.

Upon cleaning the food slicer 100 the top lid 320, cutting blade housing 220 and lower storage reservoir 120 may be disengaged at the hinges with the cutting blade 250 being releasably removed from the clamps 232.

It is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A food slicer comprising:
   a lower housing presenting a configuration including a base, a continuous vertical wall surrounding said base thus forming a receptacle having a top opening;
   a cutting blade housing presented by a continuous vertical wall tracing a configuration of said vertical wall of said lower housing, said cutting blade housing presenting lower and upper openings, said wall of said cutting blade housing in releasable engagement with a top edge of said wall of said lower housing with said lower opening of said engaged cutting blade housing generally congruent with said top opening of said lower housing;
   a cutting blade;
   means for mounting said cutting blade within said cutting blade housing at a position adjacent a bottom of said lower opening of said cutting blade housing and said top opening of said lower housing, said vertical wall of said cutting blade housing extending above said blade and about a food product placed on said blade;
   a top lid swingably mounted to a top edge of said vertical wall of said cutting blade housing, said top lid having a periphery that is generally congruent with a top edge of said continuous vertical wall of said cutting blade housing, said top lid having a lower depending surface rigidly integral with said top lid, said lid swingably movable between an open position with said depending surface displaced from said upper opening of said cutting blade housing for allowing deposit of the food product into the cutting blade housing and a closed position with said depending surface parallel to said blade within said housing, said lid in swingable movement from said first to said second position causing a contact of the depending surface with the food product placed atop said cutting blade, whereupon to urge the food product past said cutting blade, whereby to slice the food product and deposit the resulting slices into said engaged lower housing, a release of said lower housing from said cutting blade housing allowing access to the sliced food product in said lower housing.

2. The device as claimed in claim 1 wherein said cutting blade mounting means comprises:
   at least one flange within said cutting blade housing;
   a clamp upwardly extending from said at least one flange to releasably grip a portion of the cutting blade therein.

3. The device as claimed in claim 2 wherein said cutting blade comprises:
   a frame with a portion of said frame engaging said at least one clamp;
   a plurality of spaced-apart wires spanning said frame, said wires slicing the food product upon said urging of the food product thereby.

4. The device as claimed in claim 1 wherein said swingable mounting of said lid comprises complementary hinge means on said top lid and on said cutting blade housing, a coupling of said hinge means swingably mounting said top lid to said cutting blade housing between said open and closed positions.

5. The device as claimed in claim 1 wherein said releasable engagement of said cutting blade housing to said lower housing comprises complementary hinge means on said cutting blade housing and said lower housing, a coupling of said hinge means swingably connecting said cutting blade housing to said lower housing.

6. The device as claimed in claim 5 further comprising latch means on said cutting blade housing engageable with a portion of said lower housing whereby to lock said cutting blade housing atop said lower housing.

7. The device as claimed in claim 1 wherein said cutting blade mounting means comprises at least one clamp within said cutting blade housing for releasably engaging a portion of the cutting blade therein.

8. The device as claimed in claim 7 wherein said cutting blade comprises:
   a frame with a portion of said frame engaging said clamp;
   a plurality of spaced-apart wires span said frame, said wires slicing the food product upon said urging of the food product thereby.

* * * * *